(12) United States Patent
Takahashi

(10) Patent No.: US 6,860,636 B2
(45) Date of Patent: Mar. 1, 2005

(54) DYNAMIC PRESSURE BEARING

(75) Inventor: Takeshi Takahashi, Kashiba (JP)

(73) Assignee: Koyo Seiko Co., Ltd., Osaka (JP)

( * ) Notice: Subject to any disclaimer, the term of this patent is extended or adjusted under 35 U.S.C. 154(b) by 51 days.

(21) Appl. No.: 10/318,565

(22) Filed: Dec. 13, 2002

(65) Prior Publication Data
US 2003/0113046 A1 Jun. 19, 2003

(30) Foreign Application Priority Data
Dec. 14, 2001 (JP) ......................................... 2001-381390

(51) Int. Cl.[7] ............................................. F16C 32/06
(52) U.S. Cl. ................................... 384/119; 384/132
(58) Field of Search ................................ 384/100, 114, 384/119, 132

(56) References Cited

U.S. PATENT DOCUMENTS

| | | | |
|---|---|---|---|
| 5,423,612 A | | 6/1995 | Zang et al. |
| 5,667,309 A | * | 9/1997 | Nose .......................... 384/132 |
| 5,722,775 A | | 3/1998 | Thijsse et al. |
| 5,765,952 A | | 6/1998 | Dekker et al. |
| 5,770,906 A | * | 6/1998 | Hazelton et al. ............ 384/132 |
| 5,806,987 A | * | 9/1998 | Nose et al. .................. 384/100 |
| 6,079,879 A | | 6/2000 | Takahashi |
| 6,296,391 B1 | * | 10/2001 | Hayakawa et al. .......... 384/119 |

FOREIGN PATENT DOCUMENTS

| | | |
|---|---|---|
| JP | 09-273543 | 10/1997 |
| JP | 2000-192946 | 7/2000 |
| JP | 2001-173656 | 6/2001 |

* cited by examiner

Primary Examiner—Thomas R. Hannon
(74) Attorney, Agent, or Firm—Jordan and Hamburg LLP

(57) ABSTRACT

A dynamic pressure bearing is provided which has a lubricant fluid reservoir space that can easily cope with increasing and decreasing of a lubricant fluid, and that can surely prevent leakage of the lubricant fluid to the outside caused by thermal expansion due to temperature rise, from occurring, and which can be processed relatively easily.

4 Claims, 8 Drawing Sheets

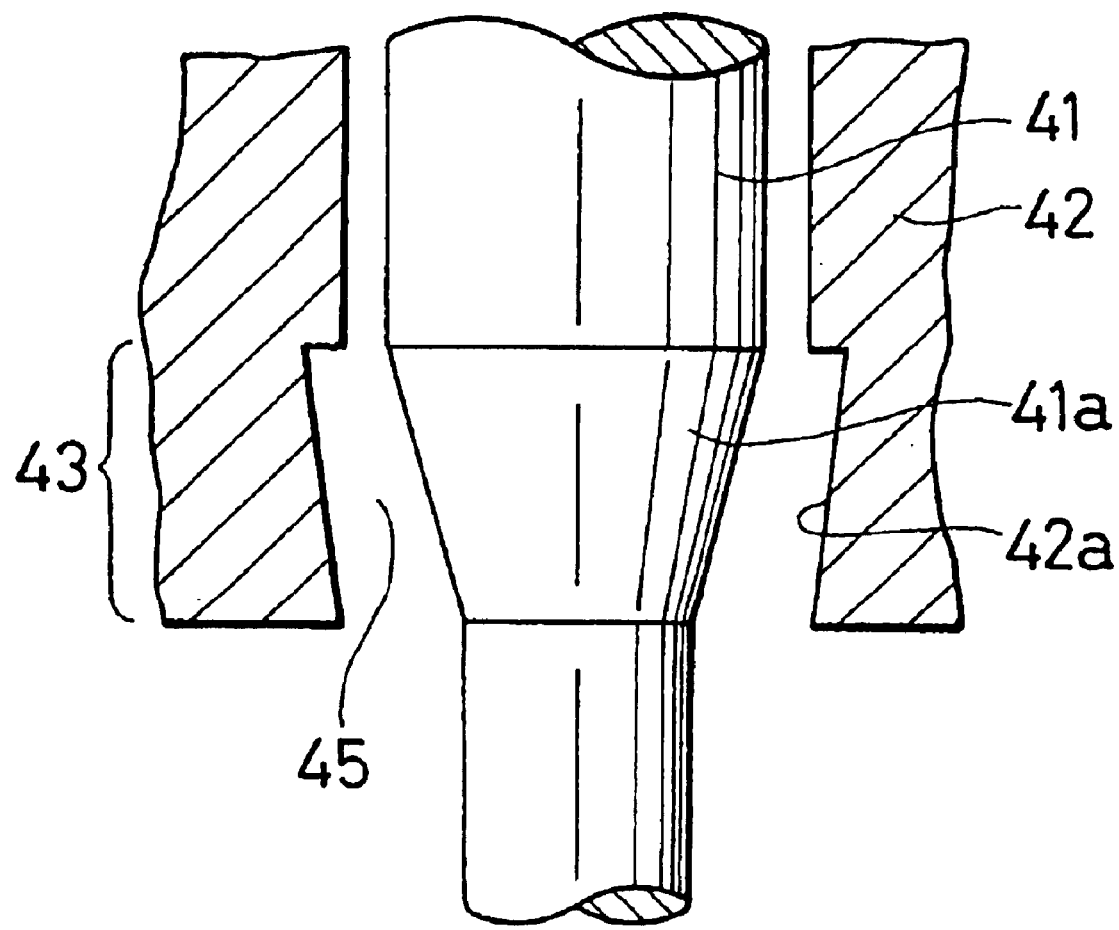

DYNAMIC PRESSURE BEARING

BACKGROUND OF THE INVENTION

The present invention relates to a dynamic pressure bearing, and more particularly to a dynamic pressure bearing which can easily cope with increasing and decreasing of a lubricant, in which leakage of a lubricant fluid to the outside caused by thermal expansion due to temperature rise can be surely prevented from occurring, and which can be processed relatively easily.

Recently, a dynamic pressure bearing is used more frequently as a bearing in a rotation support portion for an optical or magnetic disk drive for a computer system, or for a spindle motor. Such a dynamic pressure bearing is configured in the following manner. Herringbone-like or spiral dynamic pressure grooves are formed on one of a shaft and a sleeve which are relatively rotated and opposed via a small gap in a radial direction, or one of a flange which is formed integrally with a shaft and a sleeve in which a space for allowing the flange to be fitted thereinto via a small gap is formed. A lubricant fluid is filled into the gap, so that a non-contact bearing in a radial or thrust direction is formed by using a dynamic pressure generated during relative rotation. In such a bearing, a countermeasure is taken so that the lubricant fluid hardly leaks to the outside even when so-called "precession movement" occurs between the shaft and the sleeve at starting or stopping.

FIG. 5 shows an example of a dynamic pressure bearing in which a countermeasure for preventing a lubricant fluid from leaking is taken. The exemplified bearing is a radial dynamic pressure bearing in which dynamic pressure grooves 13 are formed in an inner peripheral face of a sleeve 12 that is relatively rotated, and a shaft 11 is fitted into the sleeve. In the radial dynamic pressure bearing, a tapered portion 11a in which the diameter is smaller as further moving toward the open side is disposed in an end part of the shaft 11, and a shaft portion 11c in which a step 11b is formed to have the same shaft diameter as that of the inner portion is disposed on an axially outer side of the tapered portion 11a. The dynamic pressure bearing is configured so that a recess 14 for storing a lubricant fluid G is formed in the inner diameter portion of the sleeve 12 surrounding the shaft portion in which the tapered portion 11a is disposed, an open side of the recess 14 is narrowed by the shaft portion 11c, and the lubricant fluid G is pulled in toward the dynamic pressure bearing by the capillary effect due to the capillary action, thereby preventing the fluid from leaking.

Another thrust dynamic pressure bearing in which, as shown in FIG. 6, a flange 21f disposed on a shaft 21 is fitted into a recess 22a formed in a sleeve 22, dynamic pressure grooves 21c are formed on a face 21b of the flange 21f perpendicular to the axial direction to form a dynamic pressure bearing 23 between the face and an opposing face 22b of the sleeve 22 is known (Japanese Patent Publication (Kokai) No. HEI9-273543). In the bearing, an annular narrow passage 24 communicating with the recess 22a is formed between a peripheral face 21a of the shaft 21 and an inner peripheral face 22c of the sleeve 22, and a lubricant fluid reservoir 25 configured by a truncated conical inner peripheral face 22d is formed in a position which is slightly separated toward the outside from the annular narrow passage 24.

A spindle motor shown in FIG. 7 is known (Japanese Patent Publication (Kokai) No. 2000-192946). In the spindle motor, a hub 32 serving as a rotating member of the spindle motor is supported by a shaft 31 serving as a stationary member, via a radial hydrodynamic bearing R and a thrust hydrodynamic bearing S. The spindle motor comprises a flange 31f constituting a thrust receiving surface 31a (31b) of the thrust hydrodynamic bearing S, and a thrust cover 34 constituting a thrust bearing surface 33 which is opposed to the flange. The thrust cover 34 is configure by a thrust plate 35 which receives a load, a seal plate 36 which is separated from the thrust plate 35 in the axial direction, and a pocket gap 37 which is interposed between the plates 35 and 36 to hold a leaking lubricant fluid, and which has a V-like section shape.

Another dynamic pressure bearing in which a lubricant fluid reservoir is disposed in a lower portion of the bearing is known (Japanese Patent Publication (Kokai) No. 2001-82458). As shown in FIG. 8, the dynamic pressure bearing is configured by a housing 42, and a shaft 41 which is fitted into the housing 42 with forming a constant gap therebetween. Dynamic pressure grooves are formed in one of an outer peripheral face of the shaft 41 and an inner peripheral face of the housing 42. A tapered shaft portion 41a in which the diameter is smaller as further moving toward the open side is formed in the shaft 41, and a similar tapered inner peripheral face 42a is formed in a position where the shaft portion 41a is placed, to form a constant space 45, thereby forming a capillary sealing portion 43 in which the inner diameter of the tapered inner peripheral face 42a of the housing 42 is gradually increased as moving from an opening 42a toward the inner area in the axial direction.

As described above, in a dynamic pressure bearing in which an opening portion is formed on the atmospheric side, a gap shape of opposing bearing portions in the interface between a lubricant fluid and the air (atmosphere) is provided with a tapered portion in which the diameter is smaller as further moving in a direction opposite to a centrifugal force, i.e., toward the open side. Furthermore, constant "wettability" is required between the tapered shaft surface and the lubricant fluid. In order to ensure the "wettability", a certain surface roughness must be attained in a process of processing the surface. However, a fine finishing process must be performed because a stepped portion is in a gap space in a lubricant fluid reservoir. In such a case, therefore, it is difficult to balance the finishing accuracy with the surface roughness. A fine tapering process which is to be applied to a hard shaft causes the process cost to be increased.

On the other hand, during an operation of such a dynamic pressure bearing, the temperature of a lubricant fluid is raised, and the volume of the lubricant fluid in the lubricant fluid reservoir in the vicinity of the opening is increased, so that the lubricant fluid may leak to the outside during "precession movement" which occurs at starting, stopping, or the like. By contrast, at ordinary temperature, a given amount of lubricant fluid must be held in the lubricant fluid reservoir. Therefore, the capacity of the lubricant fluid reservoir space on the side of the opening must be formed so as to have a capacity which can cope with increasing and decreasing of the lubricant fluid.

In the formation of the space for holding the lubricant fluid (the lubricant fluid reservoir), consideration must be taken not only on that the lubricant fluid is held so as not to leak, but also on that the capillary effect is maintained so as to exert the function of rapidly pulling back the lubricant fluid to the dynamic pressure bearing portion. Consequently, it is difficult to determine the shape of the space.

SUMMARY OF THE INVENTION

The invention has been conducted in order to solve the above-discussed problems. It is an object of the invention to provide a dynamic pressure bearing which has a lubricant fluid reservoir space that can easily cope with increasing and decreasing of a lubricant fluid, and that can surely prevent leakage of the lubricant fluid to the outside caused by thermal expansion due to temperature rise, from occurring, and which can be processed relatively easily.

In order to solve the problems, a first invention is characterized in that, in a dynamic pressure bearing in which a shaft is fitted into a sleeve via a minute gap, dynamic pressure grooves are formed in at least one of an inner peripheral face of the sleeve and an outer peripheral face of the shaft, and a lubricant fluid is filled into the minute gap, first and second tapered portions are disposed in an end part of the sleeve, the first tapered portion in which a diameter is gradually increased toward an outer side in a radial direction as moving from an end face of the sleeve toward an inner side, and the second tapered portion which is continuous to the first tapered portion, and in which a diameter is gradually decreased toward an outer side in a radial direction as moving toward the inner side, an inclination angle β of the second tapered portion with respect to the shaft is 4° to 10°, and an inclination angle α of the first tapered portion with respect to the shaft is smaller than the inclination angle β of the second tapered portion with respect to the shaft.

A second invention is characterized in that an axial length of the first tapered portion is shorter than an axial length of the second tapered portion.

A third invention is characterized in that the shaft has a columnar shape of a uniform diameter, and is rotatable.

A fourth invention is characterized in that, in the third invention, the shaft is made of stainless steel, and the sleeve is made of a copper alloy.

BRIEF DESCRIPTION OF THE DRAWINGS

FIG. 8 is a partial longitudinal section view of a conventional dynamic pressure bearing.

DETAILED DESCRIPTION OF THE PREFERRED EMBODIMENTS

Hereinafter, a specific embodiment of the invention will be described with reference to the accompanying drawings.

Figure 1:
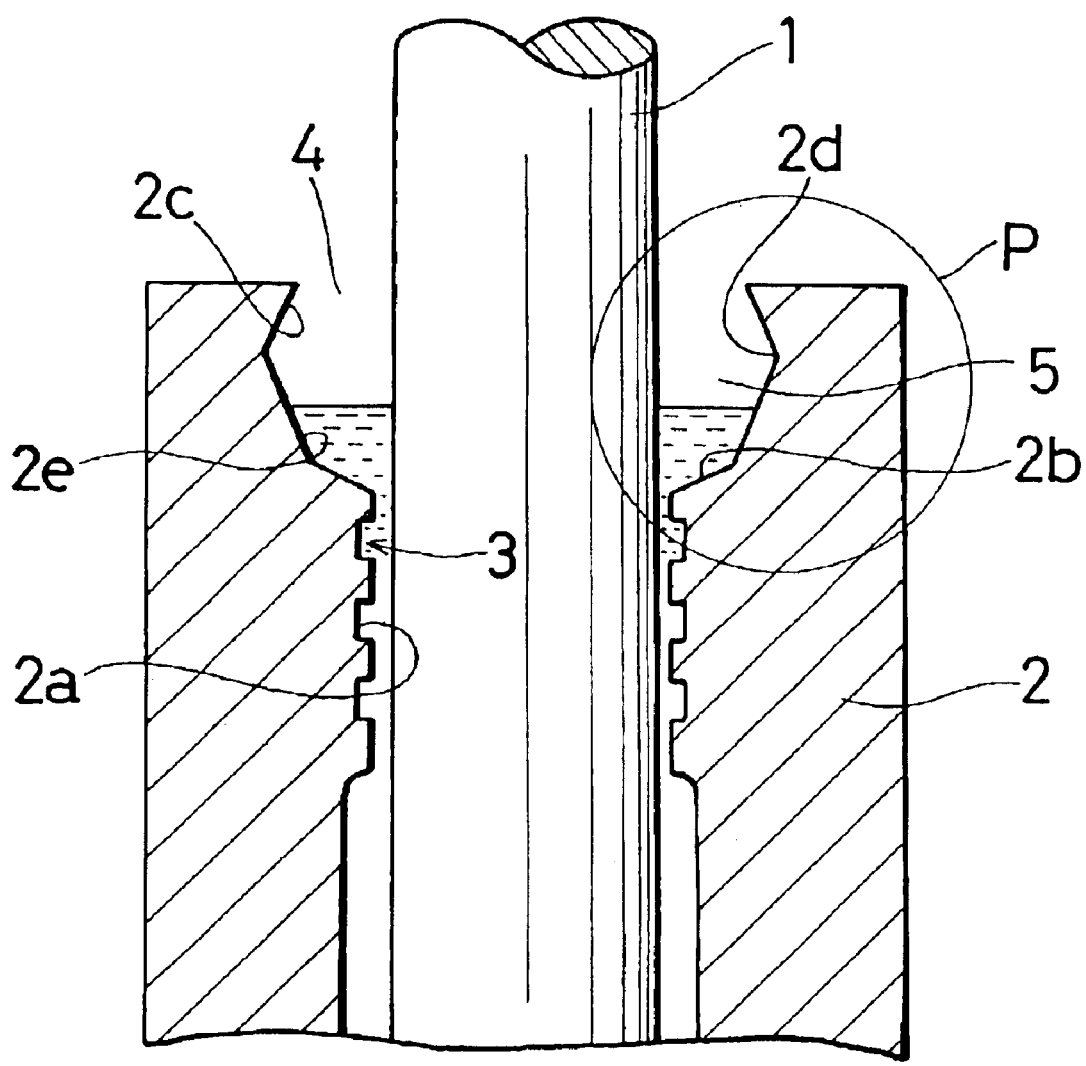
FIG. 1 is a partial longitudinal section view of a dynamic pressure bearing of the invention.

FIG. 1 is a partial longitudinal section view of a dynamic pressure bearing of the invention. The dynamic pressure bearing is configured by a shaft 1 made of a hard material, and a sleeve 2 into which the shaft 1 is to be fitted, and which is made of a relatively soft material. A small gap (3 $\mu$m to 10 $\mu$m) is formed between the shaft 1 and the sleeve 2, and herringbone-like or spiral grooves 2a are formed in an inner peripheral face of the sleeve 2, whereby a radial dynamic pressure bearing 3 is formed (alternatively, the dynamic pressure grooves may be formed on the shaft 1). For example, a ferromagnetic member is disposed on the side of the sleeve 2, and the shaft 1 is fixed to a base on which a magnetic coil is disposed so as to be opposed to the ferromagnetic member on the sleeve, so that they function as relative rotating members of a spindle motor.

Usually, the shaft 1 is straightly placed. A space 5 in which an opening 4 is formed in an end part, and which serves as a lubricant fluid reservoir of a constant capacity is formed in an upper end part of the sleeve 2 into which the shaft 1 is fitted. A first tapered portion 2c is formed in an inner diameter portion of the sleeve 2 so that the inner diameter of the space 5 is larger as downward moving from the opening 4 to the middle. An interconnecting portion 2d is formed in the middle of the first tapered portion 2c. A second tapered portion 2e is formed so that the inner diameter of the space 5 is smaller as further downward moving from the interconnecting portion 2d. A gap of 0.15 mm to 0.35 mm is formed between the shaft 1 and a portion which is continuous from the first tapered portion 2c to the second tapered portion 2e. In this case, since the shaft 1 must be provided with strength of a certain degree, the shaft is made of a hard material such as stainless steel, and the sleeve 2 is made of a copper alloy which is a soft material. From the viewpoint of processing, therefore, it is efficient to dispose the tapered portions on the side of the sleeve 2. An inclined face 2b is formed in an area extending from an ending portion of the second tapered portion 2e to a position which is slightly upward separated from the radial dynamic pressure bearing 3 of the sleeve.

Figure 2:
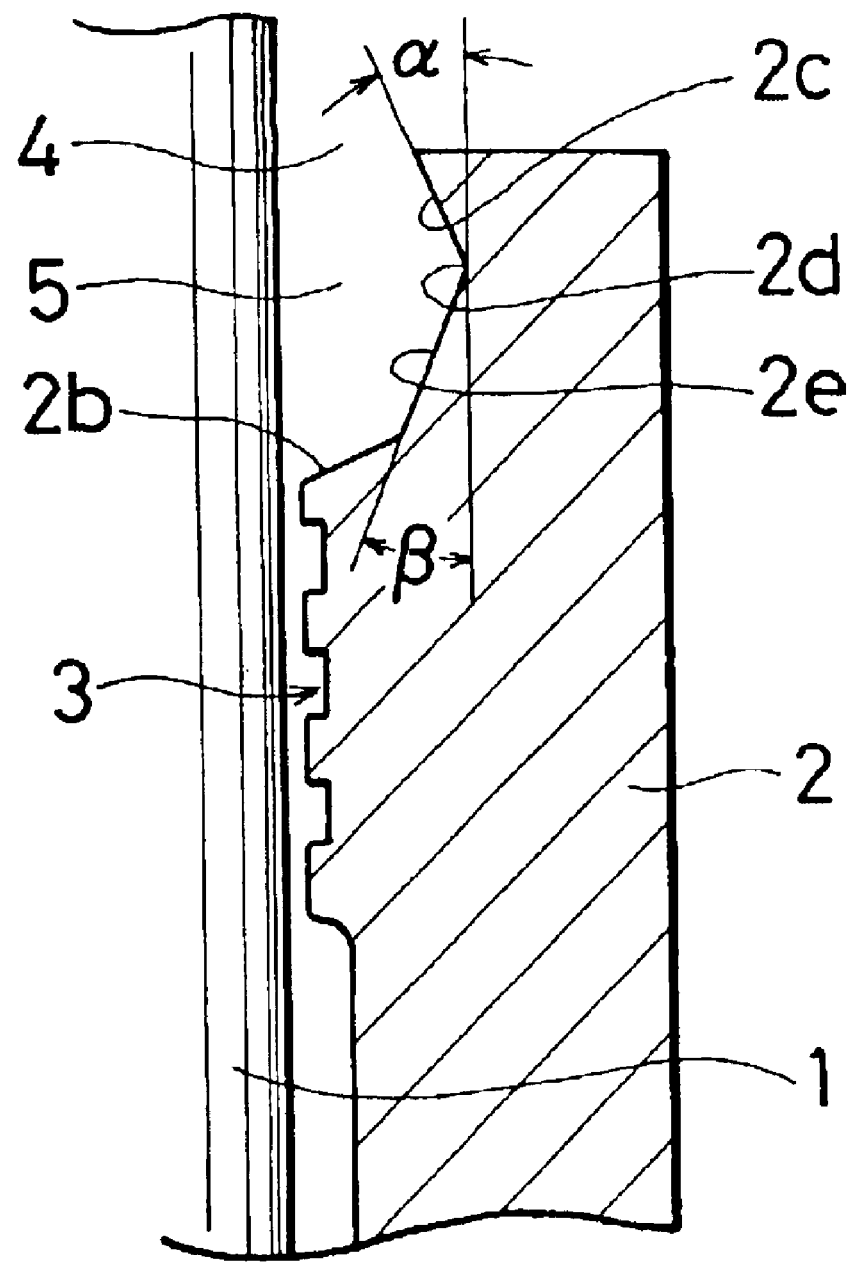
FIG. 2 is an enlarged view of the part P of FIG. 1 which is a partial longitudinal section view of the dynamic pressure bearing of the invention, and illustrating an inclination angle of a tapered portion disposed on an inner peripheral face of a sleeve.

FIG. 2 is an enlarged view of the part P of FIG. 1. In the space 5 which is formed in the upper end part between the shaft 1 and the sleeve 2, and which serves as a lubricant fluid reservoir, the angle of the first tapered portion 2c which is formed on the sleeve 2, with respect to a vertical plane, i.e., the taper angle (inclination angle) α is set to 1° or larger. The angle of the second tapered portion 2e of the sleeve 2 with respect to a vertical plane, i.e., the taper angle (inclination angle) β is set to 4° to 10°. In this way, the inclination angle α of the first tapered portion 2c is set to 1° or larger, and the inclination angle β of the second tapered portion 2e is particularly set to 4° to 10° because of the following reason. When the angle is set to 10° or larger, a centrifugal force becomes excessively large. When the angle is set to 4° or smaller, the capillary effect almost disappears so that the lubricant fluid poorly returns in a cooled state. The inclination angle α of the first tapered portion 2c is formed because of the following reason. During an assembling step, there is a fear that particle oil having a diameter of 0.1 mm to 0.2 mm adheres to the bearing. Therefore, such particle oil which does not produce the capillary effect is pulled back to the second tapered portion 2e by a centrifugal force, thereby improving the capillary effect of the lubricant fluid. When the inclination angle is 1° or more, this effect can be exerted. The formation of the inclined face 2b (see FIG. 1) can increase the capacity of the space 5 which serves as a lubricant fluid reservoir, so that the space can easily cope with the volume expansion of the lubricant fluid due to thermal expansion.

Figure 3:
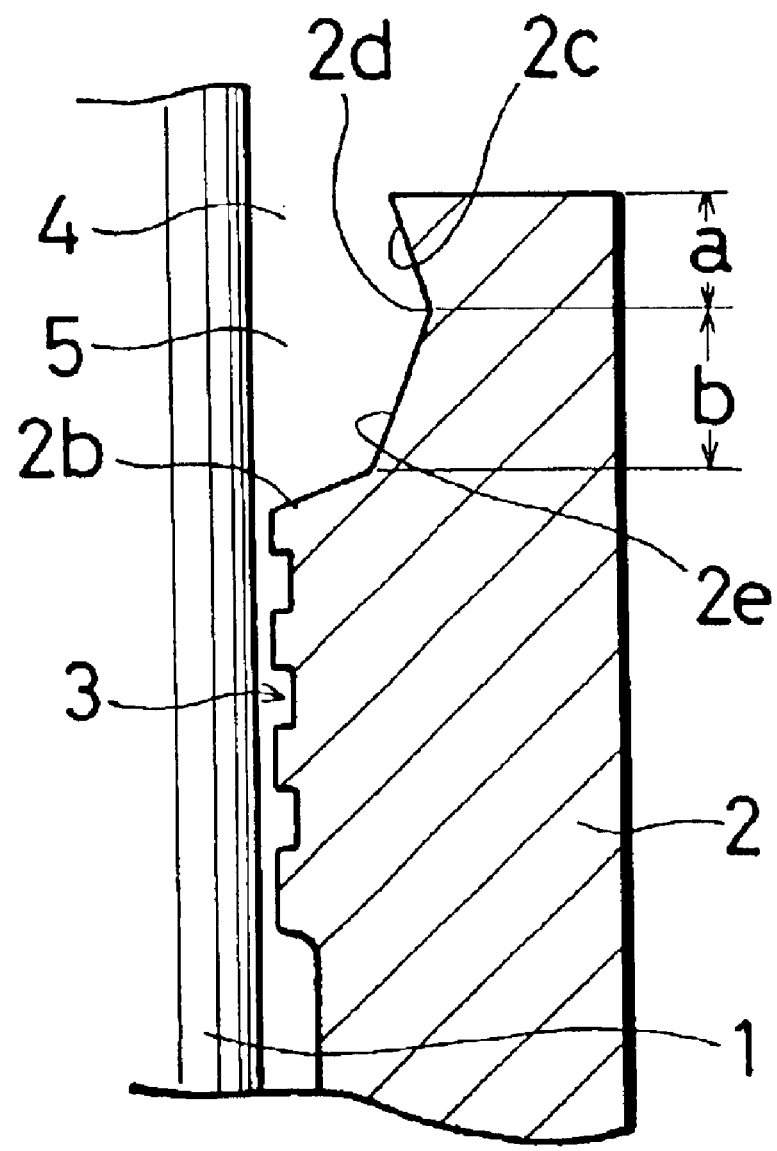
FIG. 3 is an enlarged view of the part P of FIG. 1 which is a partial longitudinal section view of the dynamic pressure bearing of the invention, and illustrating the axial length of the tapered portion disposed on the inner peripheral face of the sleeve.

FIG. 3 also is an enlarged view of the part P of FIG. 1. As shown in the figure, in the space 5 which serves as a lubricant fluid reservoir and which is formed between the shaft 1 and the sleeve 2, the vertical length a of the first tapered portion 2c which is formed on the sleeve 2 is shorter than the vertical length b of the second tapered portion 2e of the sleeve 2. Specifically, the vertical length a is set to 0.5 mm to 1.0 mm, and the length b to 1.0 mm to 1.5 mm. When the vertical length a of the first tapered portion 2c of the sleeve 2 is formed to be shorter than the vertical length b of the second tapered portion 2e, the capacity of the space 5 which serves as a lubricant fluid reservoir can be increased. Therefore, the capillary effect on the oil can be easily produced, and the space can easily cope with the volume expansion of the lubricant fluid due to thermal expansion. Moreover, the dynamic pressure bearing which requires a fine process can be processed relatively easily.

Figure 4:
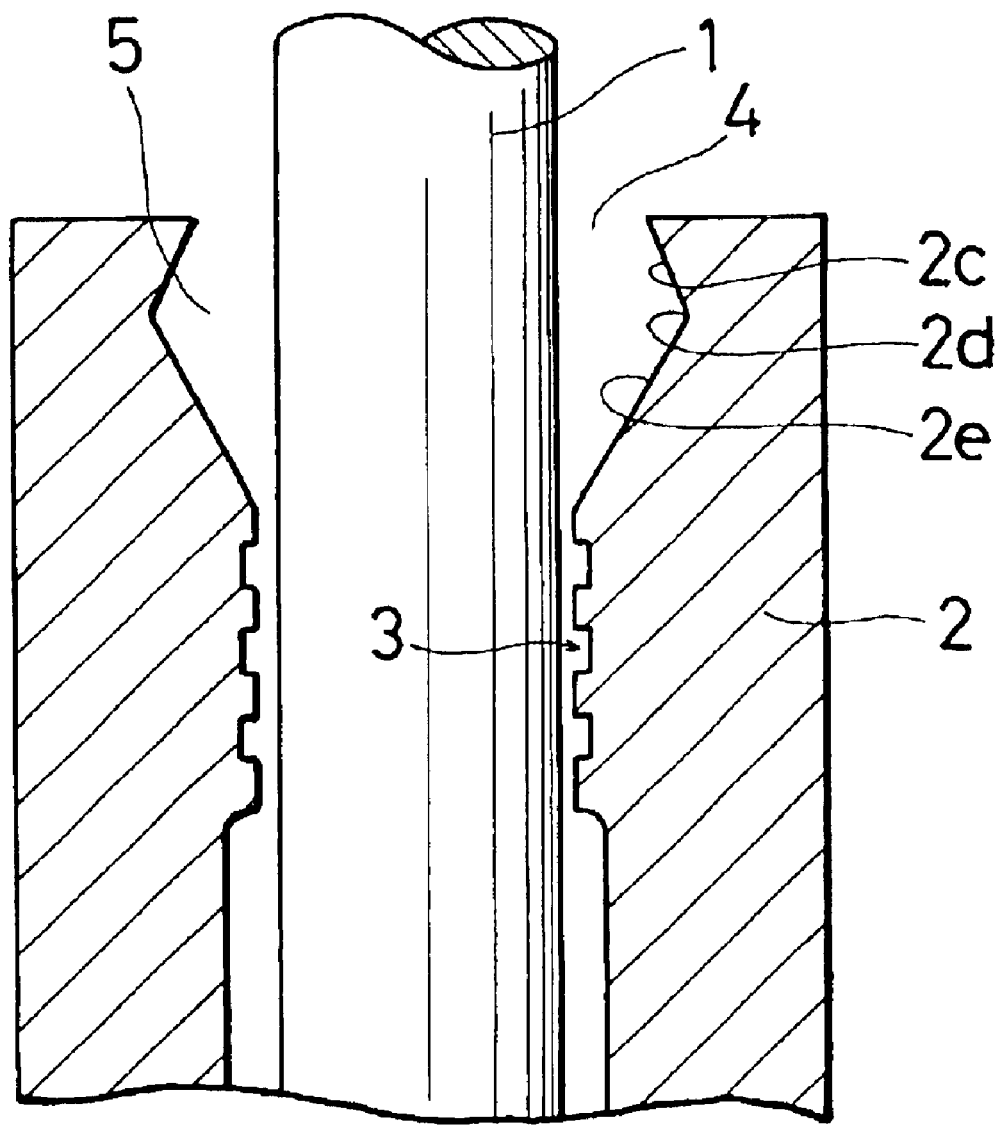
FIG. 4 is a partial longitudinal section view of a dynamic pressure bearing of the invention, and showing a case where a step is not disposed in a second tapered portion of the side of a sleeve constituting a lubricant fluid reservoir.
Figure 5:
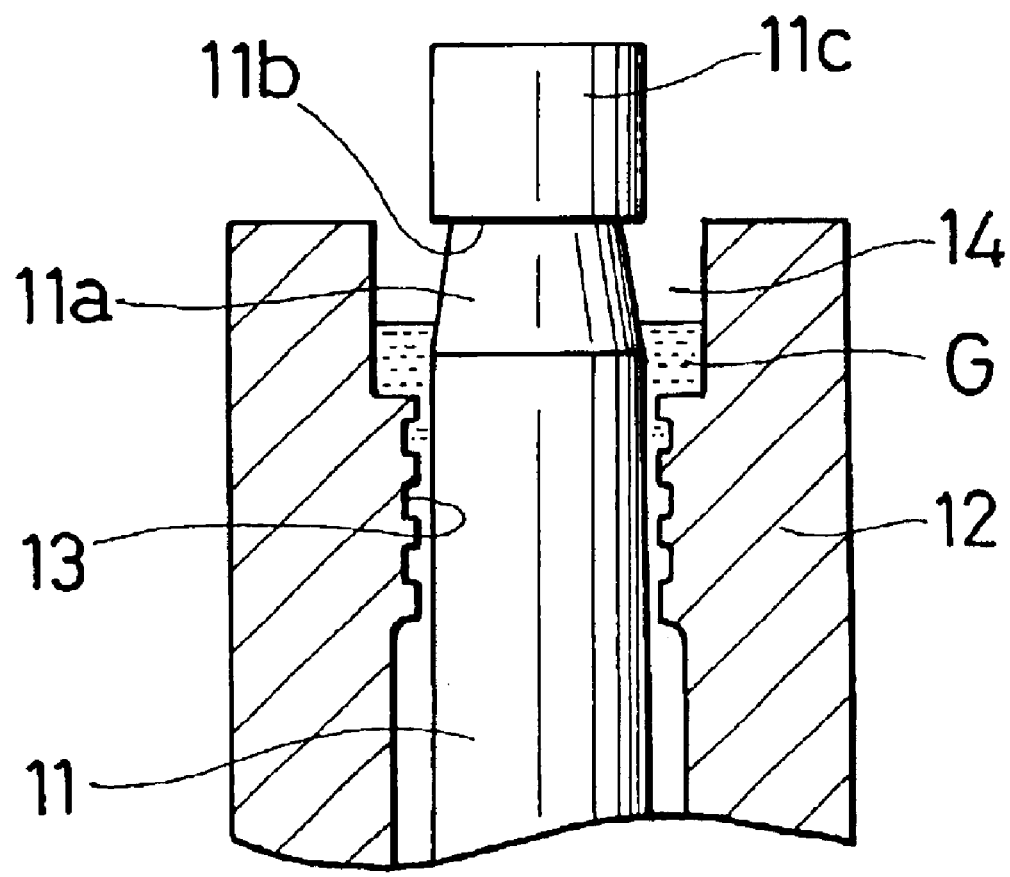
FIG. 5 is a partial longitudinal section view of a conventional dynamic pressure bearing.
Figure 6:
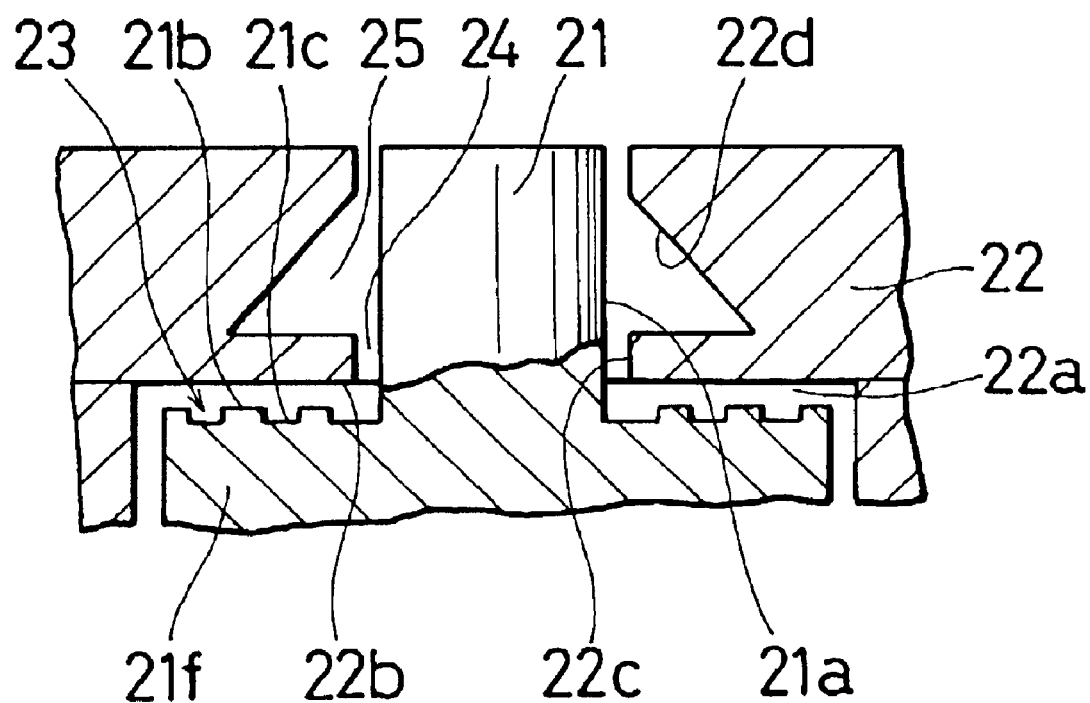
FIG. 6 is a partial longitudinal section view of a conventional dynamic pressure bearing.
Figure 7:
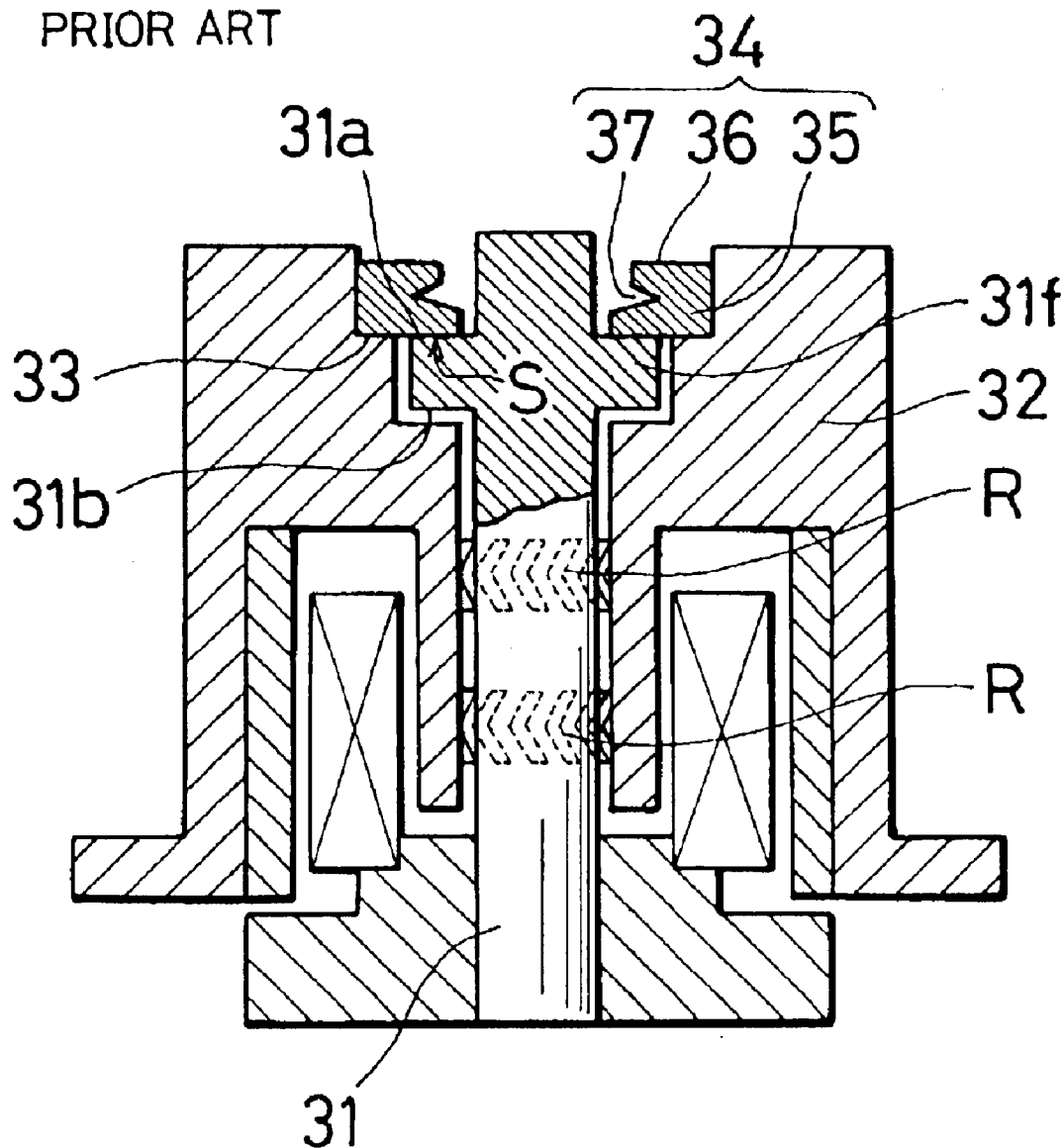
FIG. 7 is a partial longitudinal section view of a conventional dynamic pressure bearing.

The embodiment of the invention is configured as described above. Alternatively, as shown in FIG. 4, the inclined face 2b (see FIG. 1) which is disposed slightly above the radial dynamic pressure bearing 3 may not be formed, and instead the first tapered portion 2c may be formed so as to be started directly from the inner peripheral face of the sleeve 2. The interconnecting portion 2d between the first tapered portion 2c and the second tapered portion 2e is formed as a linear valley at which the first and second tapered portions 2c and 2e are changed to each other by an acute angle. Alternatively, a small linear part which vertically elongates may be formed in the interconnecting portion 2d, or the portion may be rounded.

As described above in detail, according to the dynamic pressure bearing of the invention, in response to increasing and decreasing of a lubricant fluid in a cooled state and a volume-increased state due to thermal expansion, the lubricant fluid can be rapidly supplied to a dynamic pressure bearing portion while exerting the capillary effect. Moreover, the bearing can cope with increasing and decreasing of the lubricant fluid without causing leakage. Moreover, the bearing can be processed relatively easily, and the process cost can be reduced.

What is claimed is:

1. A dynamic pressure bearing in which a shaft is fitted into a sleeve via a minute gap, dynamic pressure grooves are formed in at least one of an inner peripheral face of said sleeve and an outer peripheral face of said shaft, and a lubricant fluid is filled into said minute gap, wherein first and second tapered portions are disposed in an end part of said sleeve, said first tapered portion in which a diameter is gradually increase toward an outer side in a radial direction as moving from an end face of said sleeve toward an inner side, and said second tapered portion which is continuous to said first tapered portion, and in which a diameter is gradually decrease toward an outer side in a radial direction as moving toward the inner side, an inclination angle β of said second tapered portion with respect to said shaft is 4° to 10°, and an inclination angle α of said first tapered portion with respect to said shaft is smaller than the inclination angle β of said second tapered portion with respect to said shaft.

2. A dynamic pressure bearing according to claim 1, wherein an axial length of said first tapered portion is shorter than an axial length of said second tapered portion.

3. A dynamic pressure bearing according to claim 1, wherein said shaft has a columnar shape of a uniform diameter, and is rotatable.

4. A dynamic pressure bearing according to claim 3, wherein said shaft is made of stainless steel, and said sleeve is made of a copper alloy.

* * * * *